US007674975B2

(12) United States Patent
Atkinson et al.

(10) Patent No.: US 7,674,975 B2
(45) Date of Patent: Mar. 9, 2010

(54) SAFETY GUARD APPARATUS FOR AN ELECTRICAL OUTLET

(76) Inventors: Nicole Atkinson, 239 Cove Meadow Crescent NE, Calagry, Alberta (CA) T3K 6B1; Philip Walker, 239 Cove Meadow Crescent NE, Calagry, Alberta (CA) T3K 6B1

( * ) Notice: Subject to any disclaimer, the term of this patent is extended or adjusted under 35 U.S.C. 154(b) by 0 days.

(21) Appl. No.: 12/108,395

(22) Filed: Apr. 23, 2008

(65) Prior Publication Data

US 2009/0266574 A1 Oct. 29, 2009

(51) Int. Cl.
*H02G 3/14* (2006.01)

(52) U.S. Cl. ............................ 174/66; 174/67; 220/241

(58) Field of Classification Search .................... 174/66, 174/67; 220/241, 242; 439/136, 135, 142
See application file for complete search history.

(56) References Cited

U.S. PATENT DOCUMENTS

| | | | | |
|---|---|---|---|---|
| 3,729,572 | A | 4/1973 | Helin | |
| 4,605,270 | A | 8/1986 | Aslizadeh | |
| 4,793,818 | A | 12/1988 | Poirier | |
| 4,810,833 | A | 3/1989 | Meyers | |
| 4,857,004 | A | 8/1989 | Poirier | |
| 4,952,756 | A | 8/1990 | Meyers | |
| 5,026,299 | A | 6/1991 | Foulk | |
| 5,107,075 | A | 4/1992 | Currier, Jr. | |
| D331,386 | S | 12/1992 | Koessler | |
| 5,174,773 | A | 12/1992 | Jones | |
| 5,189,259 | A * | 2/1993 | Carson et al. | 174/66 |
| 5,212,347 | A | 5/1993 | Powers et al. | |
| D381,631 | S | 7/1997 | Hallett et al. | |
| 5,675,126 | A * | 10/1997 | Halvorsen | 174/67 |
| 5,877,450 | A * | 3/1999 | Quin | 174/66 |
| 5,895,888 | A * | 4/1999 | Arenas et al. | 174/66 |
| 5,932,845 | A | 8/1999 | Lacy | |
| 5,934,919 | A | 8/1999 | Cross et al. | |
| 6,198,046 | B1 | 3/2001 | Moodie | |
| 6,309,239 | B1 | 10/2001 | Johnston | |
| 6,342,676 | B1 | 1/2002 | Ha | |
| 6,372,987 | B1 | 4/2002 | Ha | |
| D460,421 | S | 7/2002 | Marozsan, Jr. | |
| 6,669,492 | B1 | 12/2003 | McIlvenna | |

(Continued)

FOREIGN PATENT DOCUMENTS

| | | |
|---|---|---|
| DE | 20104438 | 7/2001 |

(Continued)

*Primary Examiner*—Dhiru R Patel
(74) *Attorney, Agent, or Firm*—Maxey Law Offices; Stephen Lewellyn

(57) ABSTRACT

Safety guard apparatus for an electrical outlet having one or more electrical receptacles for restricting access to the receptacles by a young child. The apparatus includes a base plate having one or more openings for registry with the electrical receptacles. The base plate is mounted to the electrical outlet in a similar fashion to a conventional wall plate. One or more cover plates are slidably engaged to the base plate along a path that is generally perpendicular to the base plate into and out of the wall to which the electrical outlet is mounted. In a fully extended position, the one or more cover plates are pivotal to cover the one or more openings to restrict access to the electrical receptacles. A lock system prevents the one or more cover plates from being opened by young child.

8 Claims, 5 Drawing Sheets

U.S. PATENT DOCUMENTS

| | | | | |
|---|---|---|---|---|
| 6,699,060 | B1 | 3/2004 | Scott | |
| 6,805,580 | B2 | 10/2004 | Piedmont | |
| 7,094,969 | B1 | 8/2006 | In | |
| 7,097,474 | B1 | 8/2006 | Naylor | |
| 7,098,403 | B2 | 8/2006 | Jolley | |
| 7,126,059 | B2 * | 10/2006 | Dinh et al. | 174/66 |
| 7,265,292 | B2 * | 9/2007 | Greenfield | 174/67 |
| 7,284,995 | B1 | 10/2007 | Vail | |
| 7,521,632 | B2 * | 4/2009 | Johnson | 174/67 |

FOREIGN PATENT DOCUMENTS

| | | |
|---|---|---|
| JP | 5266942 | 10/1993 |
| JP | 8008005 | 12/1996 |

* cited by examiner

SAFETY GUARD APPARATUS FOR AN ELECTRICAL OUTLET

FIELD OF THE INVENTION

The present invention relates generally to electrical outlet safety devices, and more particularly, relating to a safety guard apparatus mountable to a conventional electrical outlet for preventing access to an electric receptacle by an infant or small child.

BACKGROUND OF THE INVENTION

Electrical outlets are a necessity; however, they pose a threat to the safety of children as an uncovered electrical outlet may cause grave injury should a child stick a finger or object into the outlet. Because of this ever looming danger, many safety devices have been created to limit children's access to the outlet openings. The aforementioned devices include a variety of concealment covers for the outlet, including plugs, slidable blocking plates, screw on box structures, and foldable cover plates; however, these safety devices do not take into account the moving parts exposed on the outlet cover when the safety device is not in use. In fact the very mechanisms that are supposed to be protecting children may actually pose a safety issue as multiple panels, plates, plugs, and boxes are left dangling, hanging, or exposed in the vicinity of the outlet thus creating a hazard in and of themselves. Furthermore, the exposed moving parts may detract from the surrounds and be unpleasing to the eye. Accordingly, there is a need for a safety guard apparatus for protecting an electrical outlet that has one or more slidable cover plates that are retractable into the wall to which the electrical outlet is mounted in order to conceal the cover plate when the electrical outlet is being used.

SUMMARY OF THE INVENTION

The preferred embodiments of the present invention addresses this need by providing a safety guard apparatus for replacing a conventional wall plate of an electrical outlet which includes one or more cover plates that are operable to cover the electrical outlet when not being used and which are retractable into the wall to which the electrical outlet is mounted when the electrical outlet is in use.

To achieve this and other advantages, in general, in one aspect, safety guard apparatus for an electrical outlet having one or more electrical receptacles for restricting access to the receptacles is provided. The apparatus includes a base plate having one or more openings for registry with one or more electrical receptacles of an electrical outlet; a cover plate; a guide means to engage the base plate and the cover plate together such that the cover plate may slide relative to the base plate along a path generally perpendicular to the base plate between a rearward position and a forward position; a hinge means to permit the cover plate to pivot to cover the one or more openings when the cover plate is in the forward position; and a locking means operatively associated with the cover plate and the base plate for locking the plates relative to each other when the one or more openings is covered by the cover plate.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which:

FIG. 2 is a perspective in-use view of the safety guard apparatus with one cover plate fully extended and covering one electrical receptacle, and with a second cover plate fully retracted exposing a second electrical receptacle that has a power cord plug in;

DETAILED DESCRIPTION OF THE INVENTION

Figure 1:
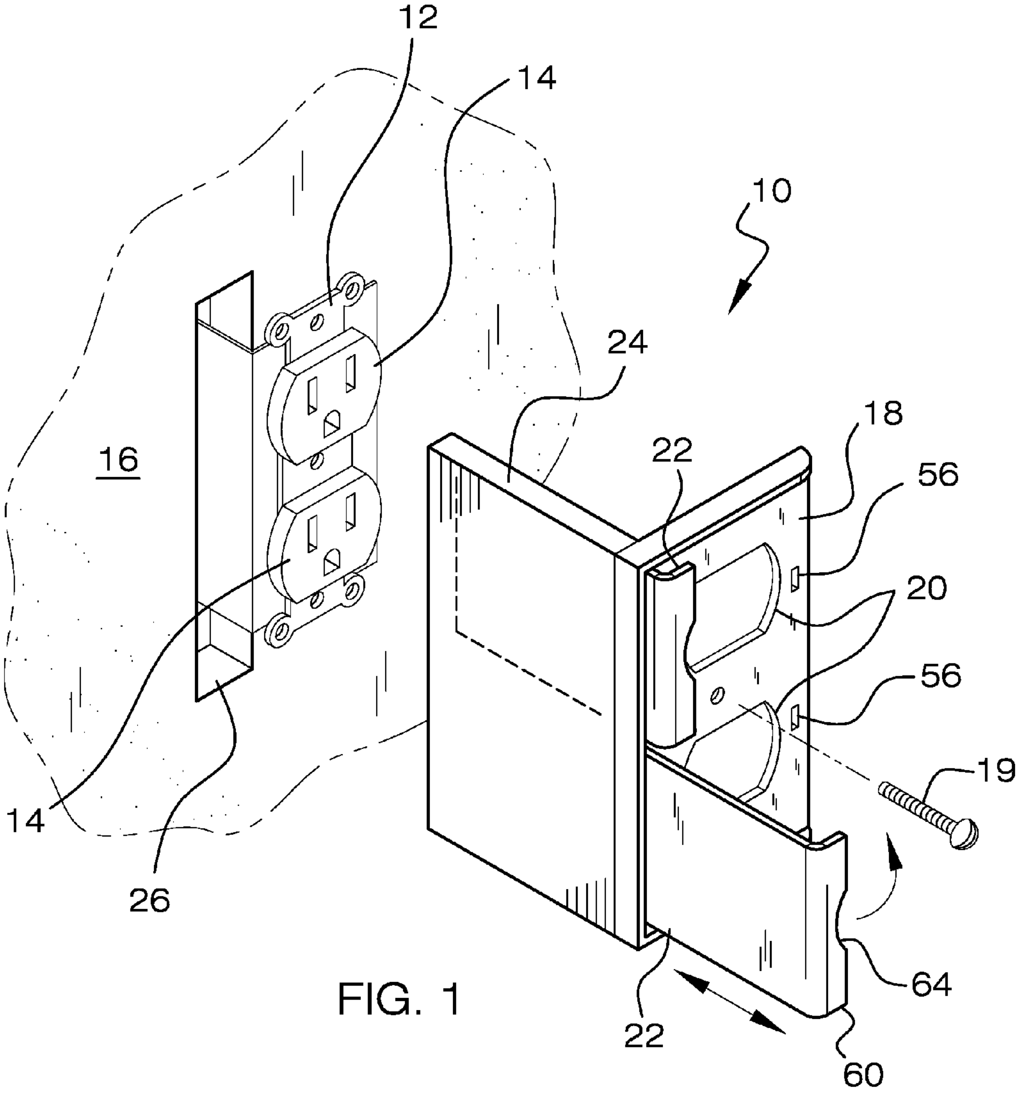
FIG. 1 is a perspective exploded view of the safety guard apparatus constructed in accordance with the principles of the present invention.

Reference will now be made in detail to the preferred embodiments of the present invention, examples of which are illustrated in the accompanying drawings.

A safety guard apparatus constructed in accordance with the principals of the present invention for restricting access to an electrical outlet by a young child is generally indicated by numeral 10 in the drawings. As shown in the drawings, the apparatus 10 is constructed and arranged for mounting to a conventional electrical outlet 12 installed in a wall 16. The electrical outlet 12 has one or more electrical receptacles 14.

Figure 2:
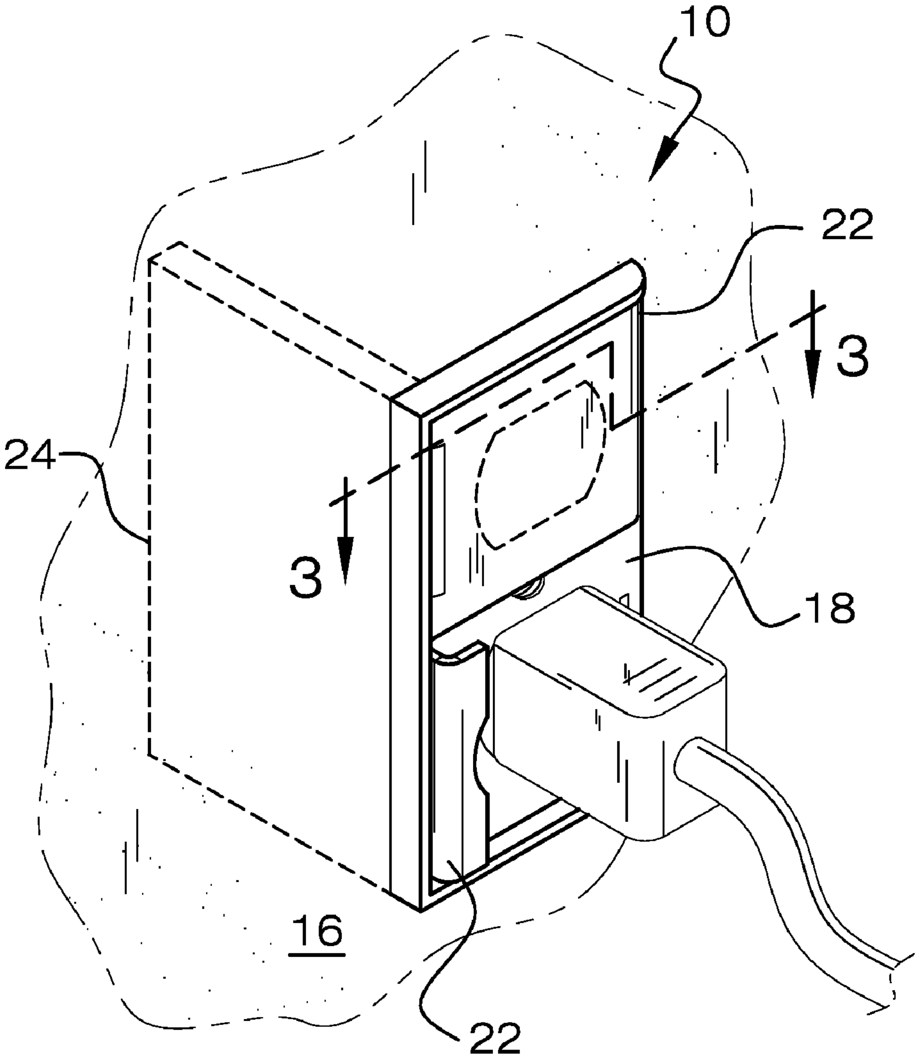

With reference to FIGS. 1 and 2, the apparatus 10 includes a base plate 18 with one or more openings 20 for registry with the electrical receptacles 14 of the outlet 12. The base plate 18 mounts to the electrical outlet 12 the way a conventional cover plate would by a center screw 19. While the base plate 18 is shown to have two openings 20, it may be configured to have as few or as many openings to match the configuration of the electrical outlet.

One or more cover plates 22 are each slidably engaged with the base plate 18 for sliding in a direction generally perpendicular to the base plate and into and out of the wall 16. Each cover plate 22 is slidable between a rearward position and a forward position. In the rearward position, the cover plate 22 is substantially stored within the wall 16 permitting unobstructed access to an electrical receptacle 14. In the forward position the cover plate 22 is pivotal to cover an opening 20 preventing access to the electrical receptacle 14. Most existing walls will need to be slightly modified by cutting an elongated slot 26 in the wall 16 adjacent the electrical outlet 12 to accommodate the sliding cover plates 22.

Figure 3:
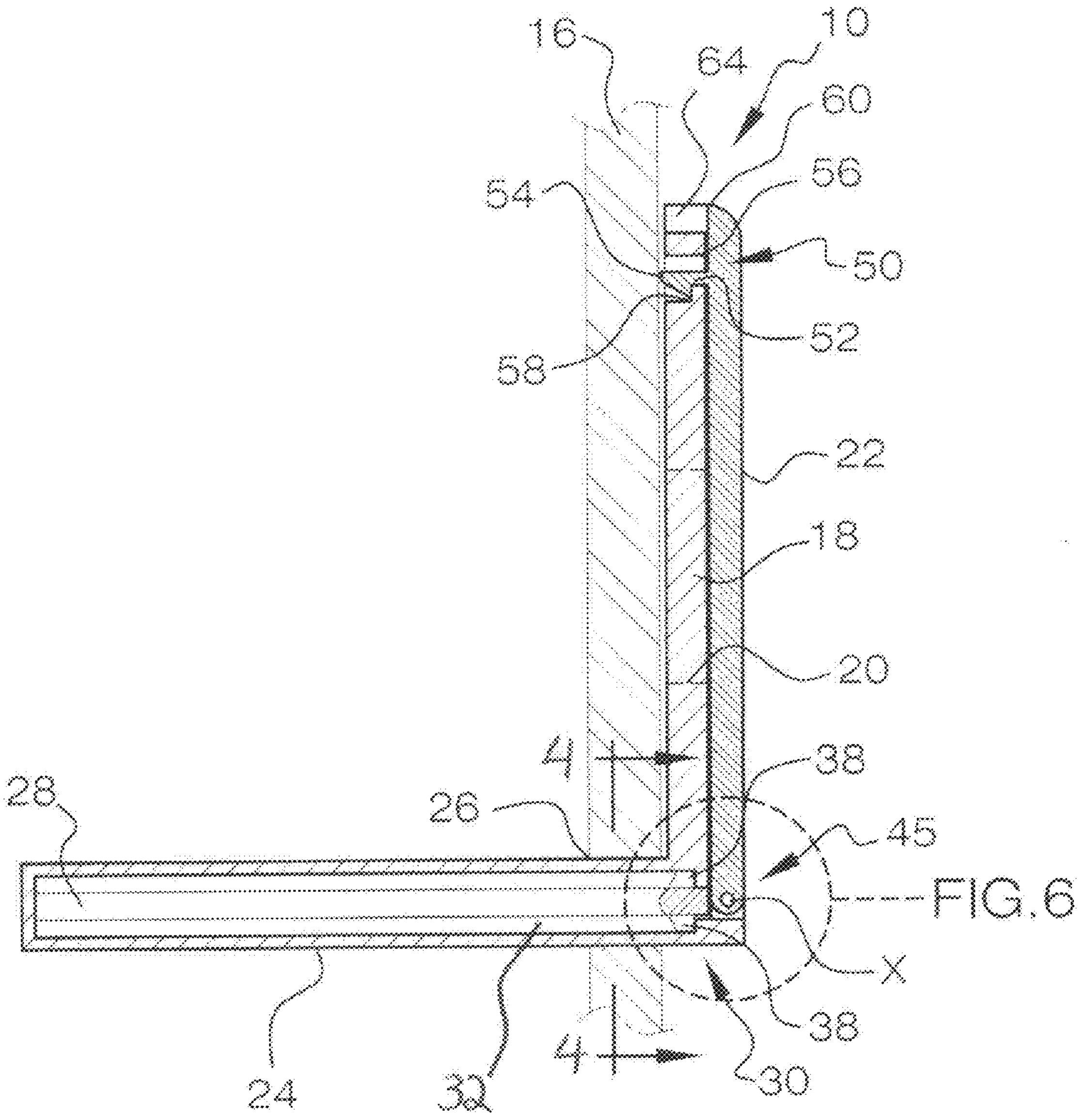
FIG. 3 is a cross-sectional view taken along line 3-3 in FIG. 2.

To protect the cover plates 22 from material within the wall 16 from obstructing the sliding operation of the cover plates into and out of the wall, a sleeve 24 may be provided in to which the cover plates are freely slidable. The sleeve 24 is aligned with the sliding path of the cover plates 22 and extends in a reward direction from the base plate 18. In FIG. 3, the cover plates 22 are slidably received by the sleeve 24 into an open interior space 28 which is sized to accommodate the cover plates therein. The sleeve 24 is shown as being formed integral with the base plate 18. Alternatively, the sleeve 24 may be removably attachable to the base plate 18 for shipping or storage.

Figure 4:
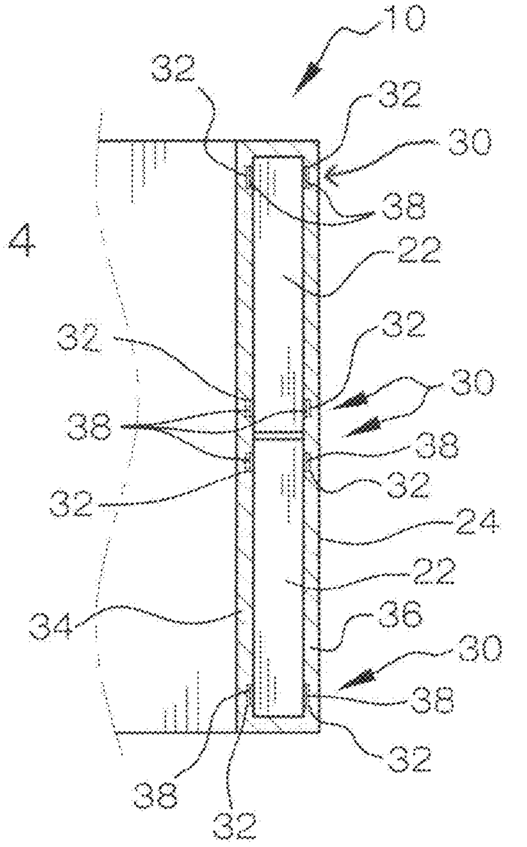
FIG. 4 is a cross-sectional view taken along line 4-4 in FIG. 3.

With reference to FIGS. 3 and 4, a guide means 30 for engaging the base plate 18 and the cover plates 22 together such that each cover plate may slide relative to the base plate along a path generally perpendicular to the base plate between a rearward position and a forward position is shown. In this example, the guide means 30 may include one or more longitudinal guide tracks 32 for each cover plate 22 that extend generally perpendicular to the base plate 18. In this specific example, there are two opposed upper guide tracks and two opposed lower guide tracks for each cover plate 22. The guide tracks 32 may be formed along the sidewalls 34 and 36 of the sleeve 24. Each cover plate 22 may include nub-like projections 38 that are slidably received within the guide tracks 32 for guiding the cover plates. Each nub-like projection 38 may taper in a direction from front to rear to permit insertion of the projections into the guide tracks 32 during assembly of the apparatus 10.

Figure 6:
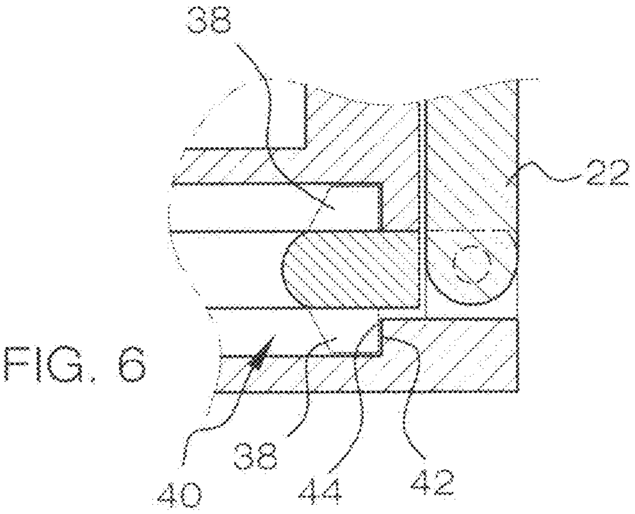
FIG. 6 is a partial enlarged detailed view.

In FIG. 6, the apparatus 10 may include a stop means 40 for each cover plate 22 to limit the forward travel of the cover plate relative to the base plate 18. As shown in FIG. 3, the stop means 40 may comprise a forward facing surface 42 of each projection 38 and an inward facing surface 44 which is caused to abut surface 42 once the cover plate 22 is completely pulled forward.

Figure 5:
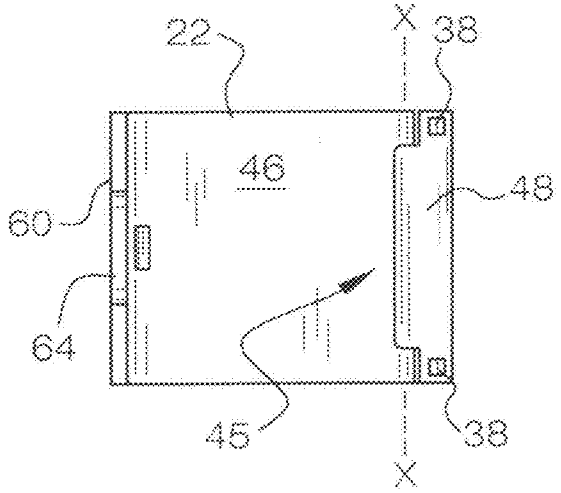
FIG. 5 is a rear elevation view of one cover plate.

Now, with reference to FIGS. 3 and 5, a hinge means 45 for each cover plate 22 to permit the cover plate to pivot to cover the one or more openings 20 when the cover plate is in the forward position is shown. In this example, the hinge means 45 comprises the cover plate 22 having a forward portion 46 pivotally connected to a rearward portion 48 for rotation about a hinge axis X. Further in this example, the nub-like projections 38 are positioned on the rearward portion 48. As can be seen in FIG. 3, once the cover plate 22 is completely pulled forward, the hinge axis X is located just forward of the base plate 18 permitting the cover plate to rotate a an inward direction to cover the one or more openings 20.

As further shown in FIG. 3, a lock means 50 for each cover plate 22 may be included. The lock means 50 is operatively associated with the cover plate 22 and the base plate 18 for locking the plates relative to each other when the one or more openings is covered by the cover plate. In this example, the lock means 50 may include a tang 52 with a hooked end 54 that is received by cooperative opening 56 through the base plate 18. The tang 52 flexes when inserted into the opening 56 until the hook-end 54 engages edge 58 of the base plate 18. To open the cover plate 22 a sufficient amount of opening force needs to be applied to disengage the hooked-end 54 from the edge 58. This force is generally greater than what a small child is capable of exerting on the cover plate 22.

With further reference to FIGS. 1, 3 and 5 the outward edge 60 of each cover plate 22 may be inwardly curved such that the outward edge 62 of the base plate 18 is covered by the cover plate to provide a more finished and aesthetically pleasing appearance when the cover plate is covering the one or more openings 20. A finger notch 64 may be formed into edge 60 to help facilitate griping of the cover plate 22 during opening thereof.

It is important to note, while the apparatus 10 was shown and described having two cover plates 22 located along the left vertical side of the base plate 18, the cover plates may be located along the right vertical side of the base plate, one cover plate may be located along the top horizontal side with a second located along the bottom horizontal side or more or less cover plates may be provided as desired.

Figure 7:
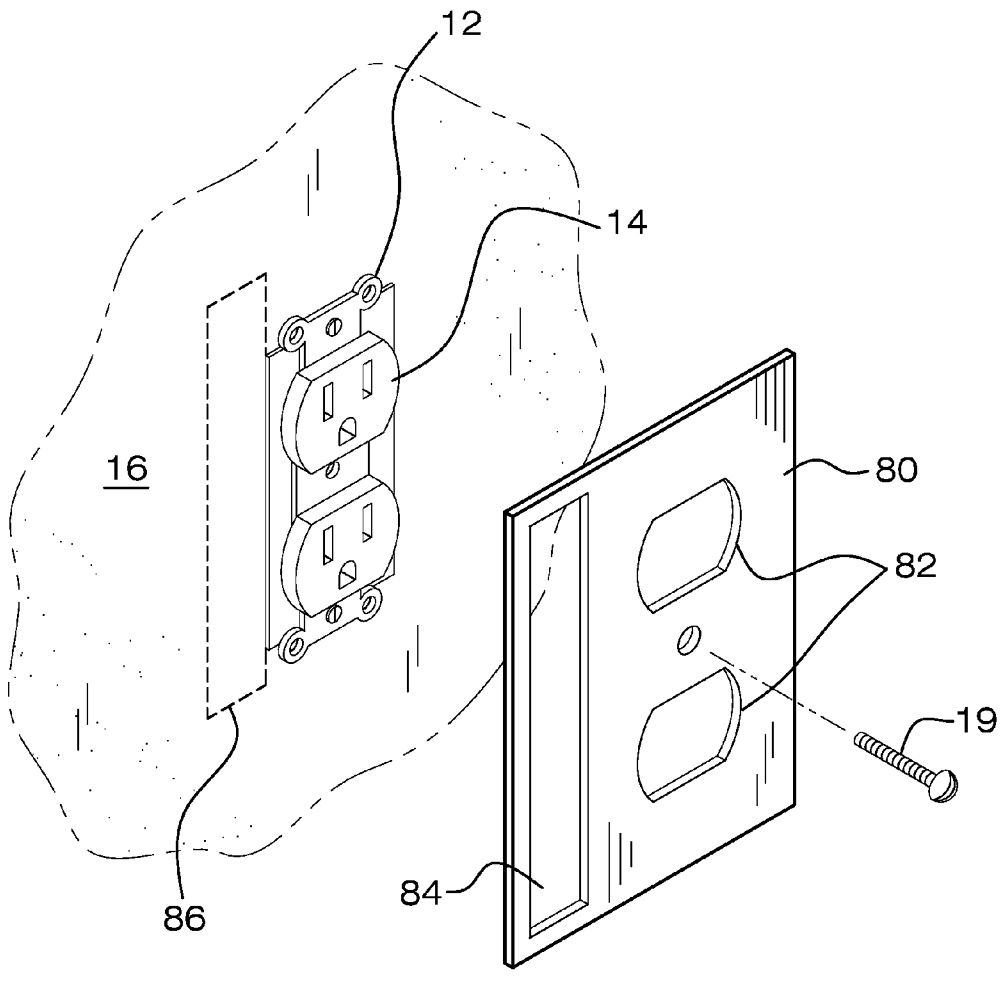
FIG. 7 is an explode perspective view of a template used to mark a cutting line for cutting an elongated slot into the wall to which the electrical outlet is mounted to permit the installation of the safety guard apparatus of the present invention.

With reference to FIG. 7, there is shown a template 80 for use in marking an existing wall for cutting the elongated slot 26. The template 80 includes one or more openings 82 for registry with the electrical receptacles 14 of the outlet 12. Adjacent the openings 82 is an elongated opening 84 having a perimeter size to correspond with the slot dimensions required to be cut into the wall 16. The template 80 may be secured in place by a center screw 19 during marking of the wall 16. Using a pen or pencil with the template 80 in place, the user scribes a cutting line 86 along the wall. Once the line 86 is scribed, the template 80 is removed, and using a knife or saw, the elongated slot 26 is cut into the wall 16 along the cutting line 86.

A number of embodiments of the present invention have been described. Nevertheless, it will be understood that various modifications may be made without departing from the spirit and scope of the invention. Accordingly, other embodiments are within the scope of the following claims.

What is claimed is:

1. A safety guard apparatus for an electrical outlet having one or more electrical receptacles for restricting access to the receptacles, the apparatus comprising:

- a base plate having one or more openings for registry with the one or more electrical receptacles of the electrical outlet, said base plate mountable to the electrical outlet to cover the electrical outlet and align the one or more electrical receptacles with said one or more openings;
- a cover plate;
- guide means for engaging said base plate and said cover plate together such that said cover plate is slidable relative to said base plate along a path generally perpendicular to said base plate between a rearward position and a forward position of said cover plate;
- hinge means for permitting said cover plate to pivot to cover said one or more openings when said cover plate is in said forward position; and
- a locking means for locking said plates relative to each other when said one or more openings is covered by said cover plate.

2. The apparatus of claim 1, wherein said cover plate includes an upper cover plate and a lower cover plate that are separate and independently movable.

3. The apparatus of claim 1, further comprising:

a sleeve extending rearward of said base plate into which said cover plate is slidable.

4. The apparatus of claim 1, wherein said guide means includes:

one or more tracks extending in a direction rearwardly of said base plate which said cover plate is slidably engaged.

5. The apparatus of claim 1, further comprising:

a stop means to limit the travel of said cover plate relative to said base plate.

6. A safety guard apparatus for an electrical outlet having one or more electrical receptacles, the apparatus comprising:

a base plate having openings for registry with the one or more electrical receptacles of the electrical outlet, said base plate mountable to the electrical outlet to cover the electrical outlet and align the one or more electrical receptacles with said one or more openings;

a first cover plate;

a first guide means for engaging said base plate and said first cover plate together such that said first cover plate is slidable relative to said base plate along a path generally perpendicular to said base plate between a rearward position and a forward position of said first cover plate;

a first hinge means for permitting said first cover plate to pivot to cover a first opening of said openings when said first cover plate is in said forward position; and a first locking means for locking said plates relative to each other when said first opening is covered by said first cover plate;

a second cover plate;

a second guide means for engaging said base plate and said second cover plate together such that said second cover plate is slidable relative to said base plate along a path generally perpendicular to said base plate between a rearward position and a forward position of said second cover plate;

a second hinge means for permitting said second cover plate to pivot to cover a second opening of said openings when said second cover plate is in said forward position; and a second locking means for locking said plates relative to each other when said second opening is covered by said second cover plate.

7. The apparatus of claim 6, further comprising:

a sleeve extending rearward of said base plate into which said first and said second cover plates are slidable.

8. The apparatus of claim 6, further comprising:

a first stop means to limit the travel of said first cover plate relative to said base plate; and a second stop means to limit the travel of said second cover plate relative to said base plate.

* * * * *